(12) United States Patent
Liu

(10) Patent No.: US 6,289,218 B1
(45) Date of Patent: Sep. 11, 2001

(54) METHOD FOR COMMUNICATING HANDSETS

(75) Inventor: Chao Yin Liu, Hsinchu (TW)

(73) Assignee: Winbond Electronics Corporation

( * ) Notice: Subject to any disclaimer, the term of this patent is extended or adjusted under 35 U.S.C. 154(b) by 0 days.

(21) Appl. No.: 09/096,210

(22) Filed: Jun. 11, 1998

(51) Int. Cl.[7] .................................................. H04Q 7/20
(52) U.S. Cl. ........................ 455/426; 455/517; 455/414; 370/503
(58) Field of Search ............................. 45/502, 517, 426, 45/524, 11.1, 509, 17, 33.1, 518, 515, 519, 526; 370/331, 503, 504, 510, 337, 280, 314

(56) References Cited

U.S. PATENT DOCUMENTS

| | | | |
|---|---|---|---|
| 4,612,415 | * | 9/1986 | Zdunek et al. .................... 455/426 |
| 5,722,076 | * | 2/1998 | Sakabe et al. .................... 455/450 |
| 5,771,463 | * | 7/1998 | Lehmusto et al. ................ 455/524 |
| 5,781,860 | * | 7/1998 | Lehmusto et al. ................ 455/524 |
| 5,787,078 | * | 7/1998 | Geywitz et al. .................. 370/331 |
| 5,907,794 | * | 5/1999 | Lehmusto et al. ................ 455/11.1 |
| 5,930,295 | * | 7/1999 | Isley, Jr. et al. ................. 375/219 |
| 5,995,500 | * | 11/1999 | Ma et al. ......................... 370/337 |

FOREIGN PATENT DOCUMENTS

WO94/05101 * 3/1994 (WO) ............................ H04B/17/00

* cited by examiner

Primary Examiner—Nay Maung
Assistant Examiner—Charles Craver
(74) Attorney, Agent, or Firm—Knobbe, Martens, Olson & Bear, LLP

(57) ABSTRACT

A method for directly communicating handsets is provided. The method includes the following steps of providing a calling handset and a called handset, inputting a first number to the calling handset for obtaining a first identification (ID) code therefor, inputting a second number to the called handset for obtaining a second ID code therefor, transmitting the first ID code from the calling handset to the called handset when the calling handset is to call the called handset, receiving the first ID code by the called handset, identifying whether the first ID code matches with the second ID code, and synchronizing the two handsets for a direct communication.

24 Claims, 11 Drawing Sheets

METHOD FOR COMMUNICATING HANDSETS

FIELD OF THE INVENTION

The present invention relates to a method for direct communication, and more particularly to a method for communicating handsets.

BACKGROUND OF THE INVENTION

The DECT (Digital Enhanced Cordless Telecommunications) is the protocol for European digital wireless telephone and can be applied for residential PABX (Private Automatic Branch Exchange). So far there is no design for direct communication of two handsets in Europe, which means that two handsets must communicate with each other through the base and be located in a place where the radio signal from the base can be received.

Referring to FIG. 1, there is schematically shown the present condition. The Base 1 is necessary for the communication of the Handset#1 2 and the Handset#2 4 which both communicate with the external (by the PSTN/ISDN) through the exchange 3 of the telephone company. The curve BSR is the boundary of the service range of Base 1. We can see that the Handset#12 5 is out of the service range and cannot communicate with Handset·2 4 though their distance is very short. The multiple handsets (parties, branches or extensions) DECT wireless telephone would be more attractive if it possesses a function similar to walkie-talkie as handsets are located far away from where the base is placed.

Referring now to FIG. 2, the DECT wireless communication standard belongs to a TDMA (Time Division Multiple Access) system and is planned to occupy 10 channels (carriers) each of which is called a DECT frame divided into 24 time slots and programmed into 12 Full Duplex Bearers wherein 12 time slots are used for up link communication and another 12 time slots for down link communication. In such DECT system, handsets communicate with each other through base 1, cannot communicate with the external if located outside of the service range of base 1, and cannot communicate with each other directly.

According to the Japanese PHS (Personal Handyphone System) which selects 10 channels out of all available channels for communicating PHS handsets, however, handsets are directly communicable in the following manner. In direct communication mode continuously scanning the 10 channels, when a (calling) handset is to call, an empty channel is selected to emit the control signal to call another (called) handset which will, once receiving the calling signal, answer the calling handset to connect and directly communicate with each other.

Since the 10 channels are to be continuously scanned and the signals are to be continuously emitted which thus are relatively energy-consuming, in order to be energy-saving, some one suggests calling and called handsets can communicate with each other if they transmit and receive signals both in the same one of the time slots of the same one of the 10 channels through the synchronous characteristics of the handset and the base. Such system still suffers from the disadvantage that handsets must be located within a region capable of receiving the radio signal of the same base in order to be able to be sychronous.

It is therefore tried by the applicant to overcome the above problems encountered by the prior art.

SUMMARY OF THE INVENTION

It is therefore an object of the present invention to provide a method of directly communicating handsets without the involvement of the base. It is another object of the present invention to provide a method of communicating handsets which are to transmit phonetic signals only when the user is talking.

It is further an object of the present invention to provide a method of communicating handsets which are relatively energy-saving. According to the present invention, a method for directly communicating handsets includes the following steps of providing a calling handset and a called handset, inputting a first number to the calling handset for obtaining a first identification (ID) code therefor, inputting a second number to the called handset for obtaining a second ID code therefor, transmitting the first ID code from the calling handset to the called handset when the calling handset is to call the called handset, receiving the first ID code by the called handset, identifying whether the first ID code matches with the second ID code, and synchronizing the two handsets for a direct communication if the first and second ID codes match with each other.

Certainly such handsets can be used in a European DECT system. The first and second numbers can be respectively encoded by the calling and called handsets into the first and second ID codes respectively. The identifying step can identify whether the first and second ID codes are identical at least in part, or alternatively are matchable with each other somehow. Preferably each of the first and second ID codes includes a direct communication ID code and a channel number.

Preferably when the calling handset calls the called handset in the present method, the calling handset enters into a direct communication idle mode in which the calling handset will proceed a direct communication calling mode for calling the called handset when a direct communication initialization of the calling handset is true.

Preferably in the direct communication calling mode, there are the following steps of locating an unused one of time slots of a respective channel, defining the one time slot as a predetermined time slot of the calling handset, and transmitting the direct communication ID code of the calling handset to the called handset in the predetermined time slot, and entering into a direct communication connection mode upon receiving an answering signal from the called handset.

Preferably a code representing the predetermined time slot is generated when the first number is encoded into the first ID code in order to synchronize handsets.

Preferably the direct communication connection mode includes the following steps of returning to the direct communication idle mode when a handshake acknowledge signal from the called handset fails, and connecting a phonetic signal of the calling handset for proceeding a directly communicating procedure upon receiving a start communication signal from the called handset.

Preferably the directly communicating procedure includes the following steps of transmitting a handshake acknowledge signal for connecting the handsets in an A-field of the predetermined time slot, and transmitting the phonetic signal to the called handset in a B-field of the predetermined time slot when a user of the calling handset is talking.

Preferably when the called handset receives the first ID code, the called handset enters into a direct communication idle mode which includes the following steps of entering into an idle state, scanning time slots of a channel corresponding the channel number, and finding a specific time slot in which a calling signal from the calling handset is received, and entering into a direct communication receiving mode when the direct communication ID codes of the first and second ID codes match with each other during the specific time slot.

Preferably the direct communication receiving mode includes the following steps of defining the specific time slot as a predetermined time slot of the called handset, transmitting an answering signal to the calling handset, and entering into a direct communication connection mode. A a code representing the predetermined time slot is generated when the second number is encoded into the second ID code in order to synchronize the handsets.

Preferably the direct communication connection mode includes the following steps of returning to the direct communication idle mode when a handshake acknowledge signal from the calling handset fails, transmitting a starting communication signal to the calling handset once a user of the called handset decides to connect, and connecting a phonetic signal of the called handset for entering into a directly communicating mode.

Preferably the directly communicating mode includes the following steps of transmitting a handshake signal for maintaining a connection between the handsets in an A-field of the predetermined time slot, and transmitting the phonetic signal to the calling handset in a B-field of the predetermined time slot when the user is talking. Each of the first and second ID numbers includes an additional encryption code.

Addressing differently the present invention, a method for directly communicating handsets includes the steps of providing a first handset and a second handset, causing the first handset to enter into a direct communication idle mode, causing the first handset to enter into a direct communication calling mode once the first handset is desired to require a direct communication, receiving a calling signal from the second handset, causing the first handset to enter into a direct communication receiving mode upon identifying the calling signal contains a partial signal matching with a corresponding one of the first handset for synchronizing the first and second handsets, causing the first handset to enter into a direct communication connection mode, and causing the first handset to enter into a directly communicating mode upon transmitting a data.

Certainly, the partial signal can be a direct communication ID code. In the calling mode, the following steps can be proceeded: locating an unused time slot, setting the unused time slot as a direct communication time slot, transmitting a calling signal in the direct communication time slot, and transmitting a confirming signal upon receiving an answering signal from the second handset. The present method can further include a step of encrypting a data before the first handset having received a handshake acknowledge signal enters into the direct communication connection mode.

Preferably the direct communication connection mode proceeds the following steps of transmitting a start communication signal upon generating the data and confirming an existence of a handshake acknowledge signal, and entering into the directly communicating mode upon receiving a start communication signal from the second handset. Preferably the directly communicating mode proceeds the following steps of returning to the direct communication idle mode upon receiving a stop communication signal from the second handset, returning to the direct communication idle mode if a handshake between the handsets fails, and transmitting a stop communication signal to enter into the direct communication mode when the first handset has an interrupted communication.

Preferably the calling signal includes an encrypted code for encrypting a data, and a channel number for identifying a communication channel. The direct communication receiving mode proceeds the following steps of identifying a communication time slot in which the calling signal is identified to contain the partial signal matching with the corresponding one of the first handset, transmitting an answering signal, and transmitting a handshake acknowledge signal upon receiving an answering confirmation signal from the second handset. The present method further includes a step of encrypting a data before entering into the direct communication connection mode.

The present invention may best be understood through the following descriptions with reference to the accompanying drawings, in which:

DETAILED DESCRIPTION OF THE PREFERRED EMBODIMENTS

Figure 1:
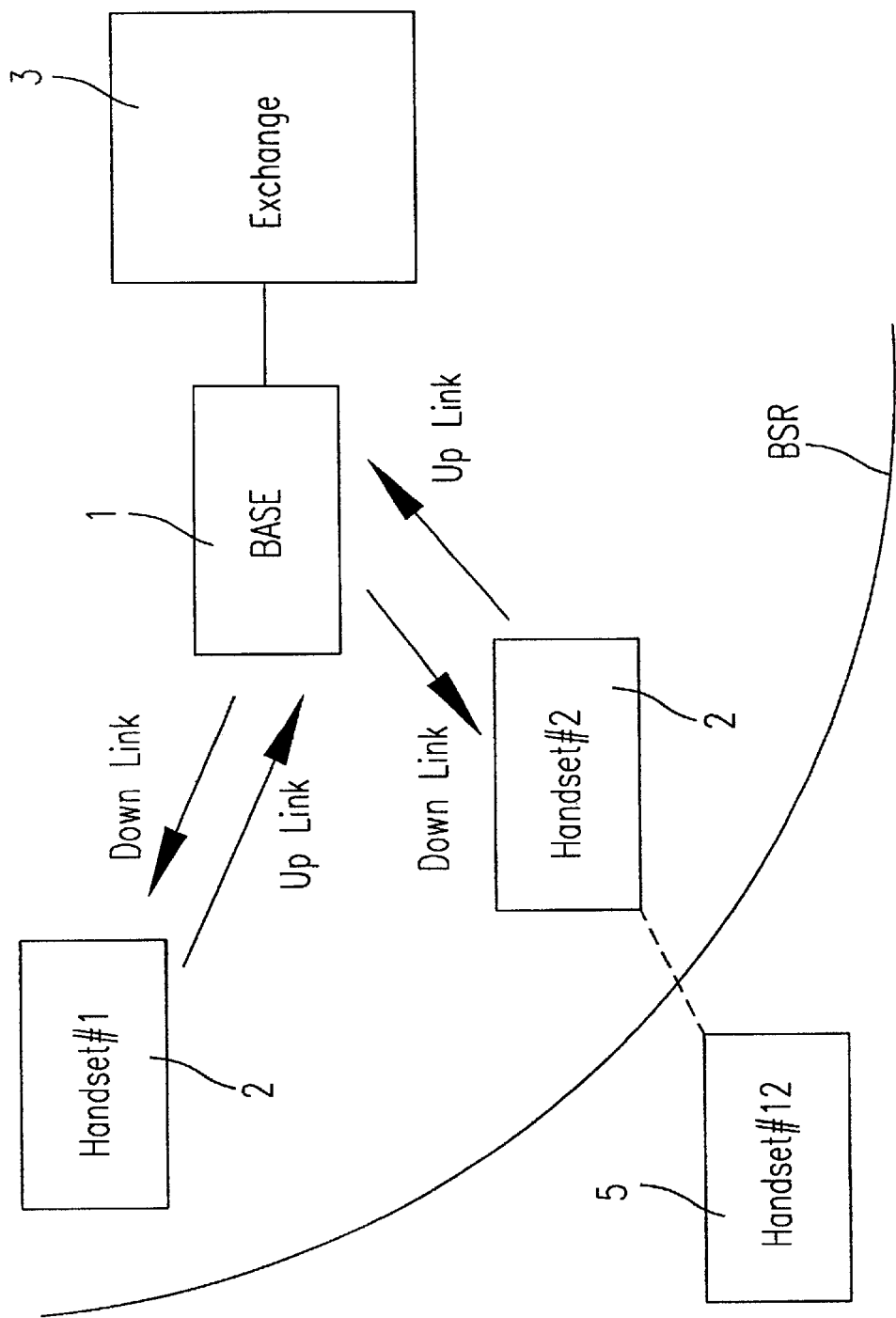
FIG. 1 is a schematical application view of a DECT wireless telephone system.
Figure 2:
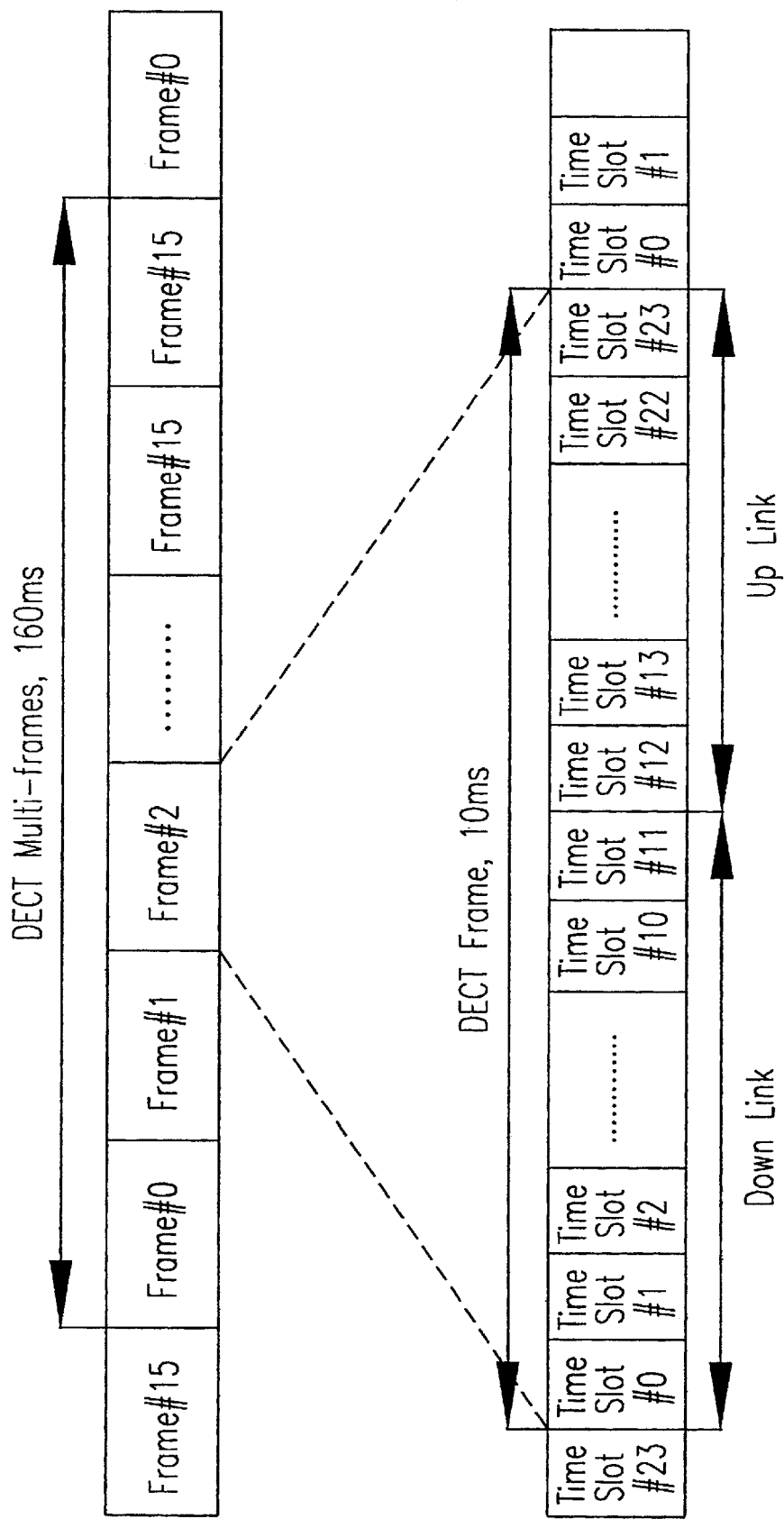
FIG. 2 is a diagram showing a signal frame in a DECT system.
Figure 3:
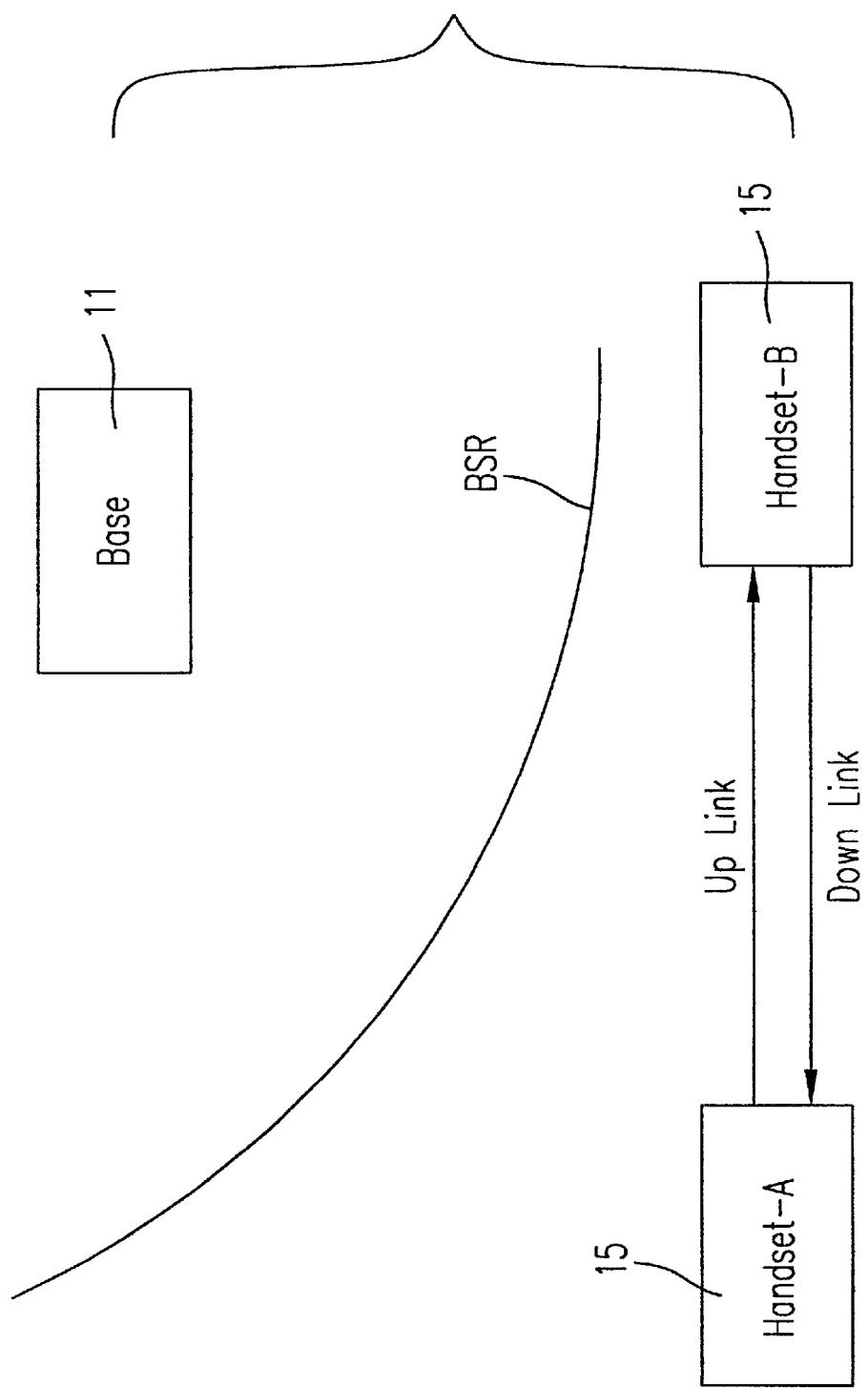
FIG. 3 is a schematic view showing two handsets directly communicating with each other.

Referring to FIG. 3, if two DECT handsets 15 are located outside of the BSR (Boundary Service Range) of the base 11, for example, the users go for party, excursion, shopping . . . etc., handsets 15 can get directly communicated through the present invention.

Figure 4:
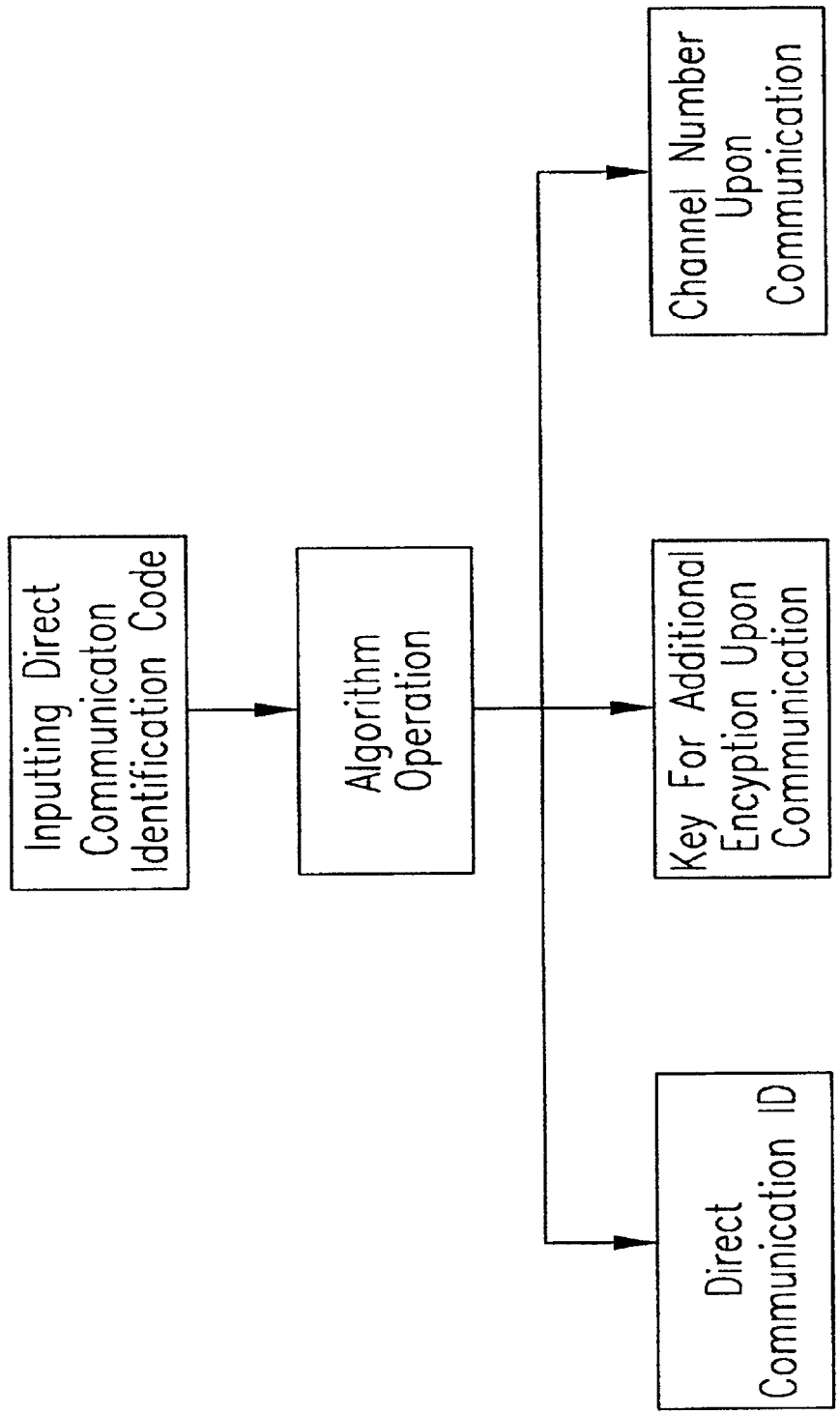
FIG. 4 is a flow chart showing what is occuring after a direct communication identification code is inputted into a handset according to the present invention.

A method for directly communicating handsets 15 according to the present invention includes the following steps of:

1) providing calling and called handsets 15 which in this embodiment are used in a European DECT system;

2) respectively inputting a first number and a second number which in this instance can be identical to calling and called handsets 15 for respectively obtaining a first and a second identification (ID) codes therefor. By this, handsets 15 enter into a direct communication idle mode. As shown in FIG. 4, through an algorithm operation which is well-known in the pertinent art and will not be further described, the first (or second) number will be encoded into the first (or second) identification code which includes three ID numbers, i.e. a direct communication identification code, a key for additional encryption and a channel number including a carrier number and a slot number for down link and/or up link for direct communication of handsets 15; and 3) transmitting the first ID code from calling handset 15 to called handset 15 when the former is to call the latter. After receiving the first ID code, the called handset 15 will identify whether the direct communication identification code in the first ID code is identical to or matches with that in the second ID code. If yes, the two handsets 15 will be synchronized for a direct communication.

Figure 5:
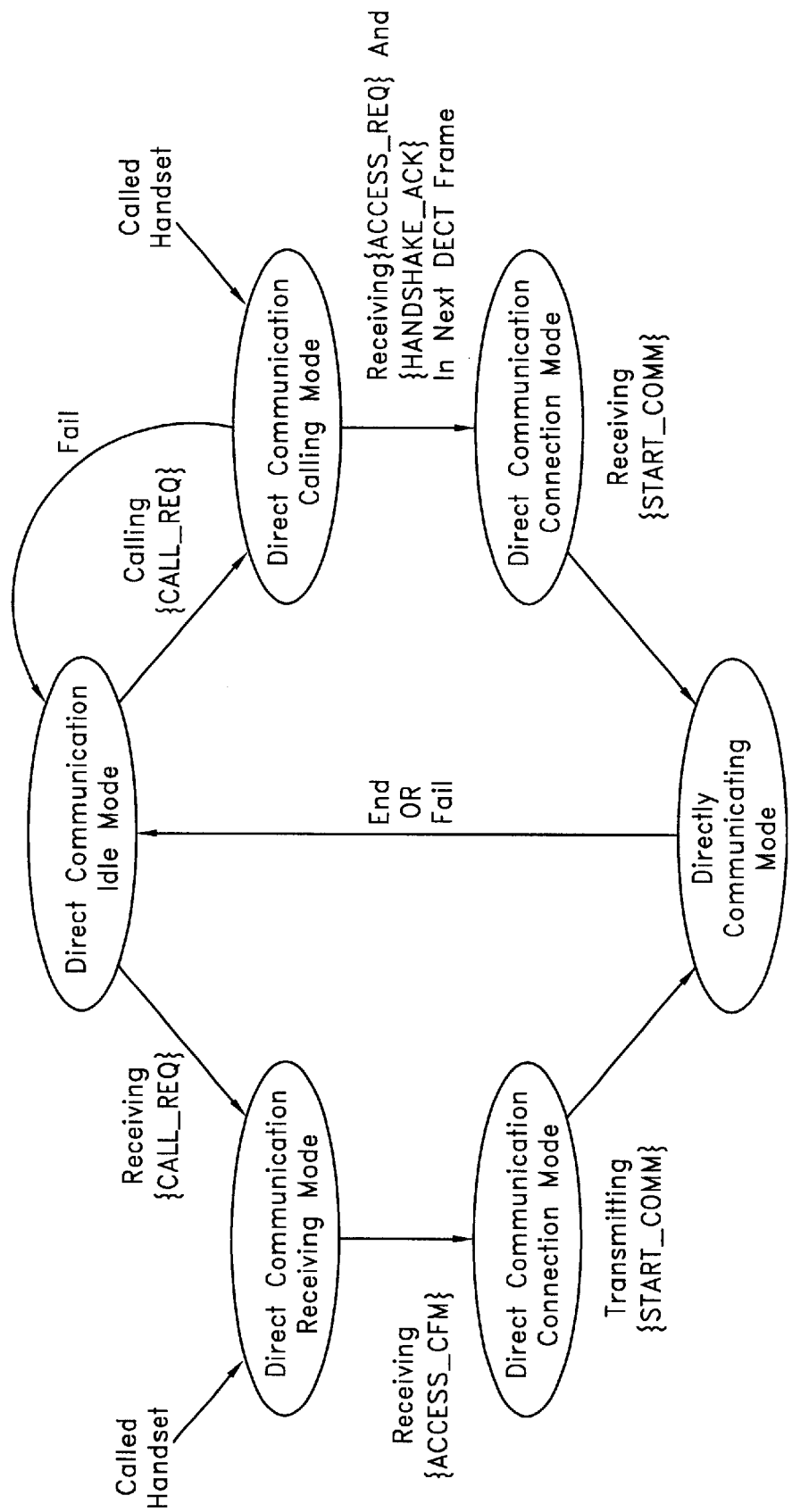
FIG. 5 is a flow chart showing how handsets become directly communicated according to the present invention.
Figure 6:
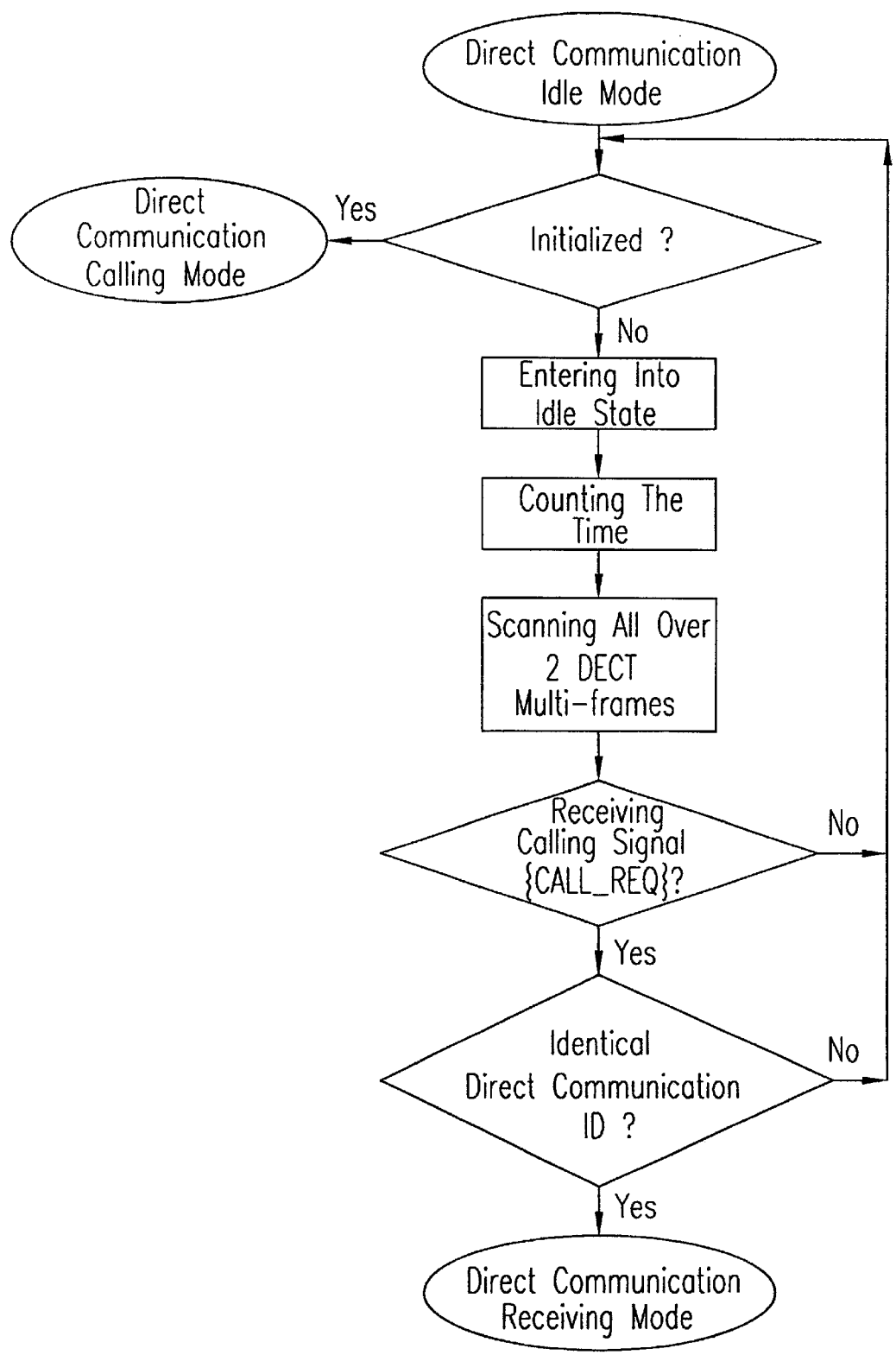
FIG. 6 is a flow chart showing what a direct communication idle mode will proceed according to the present invention.
Figure 9:
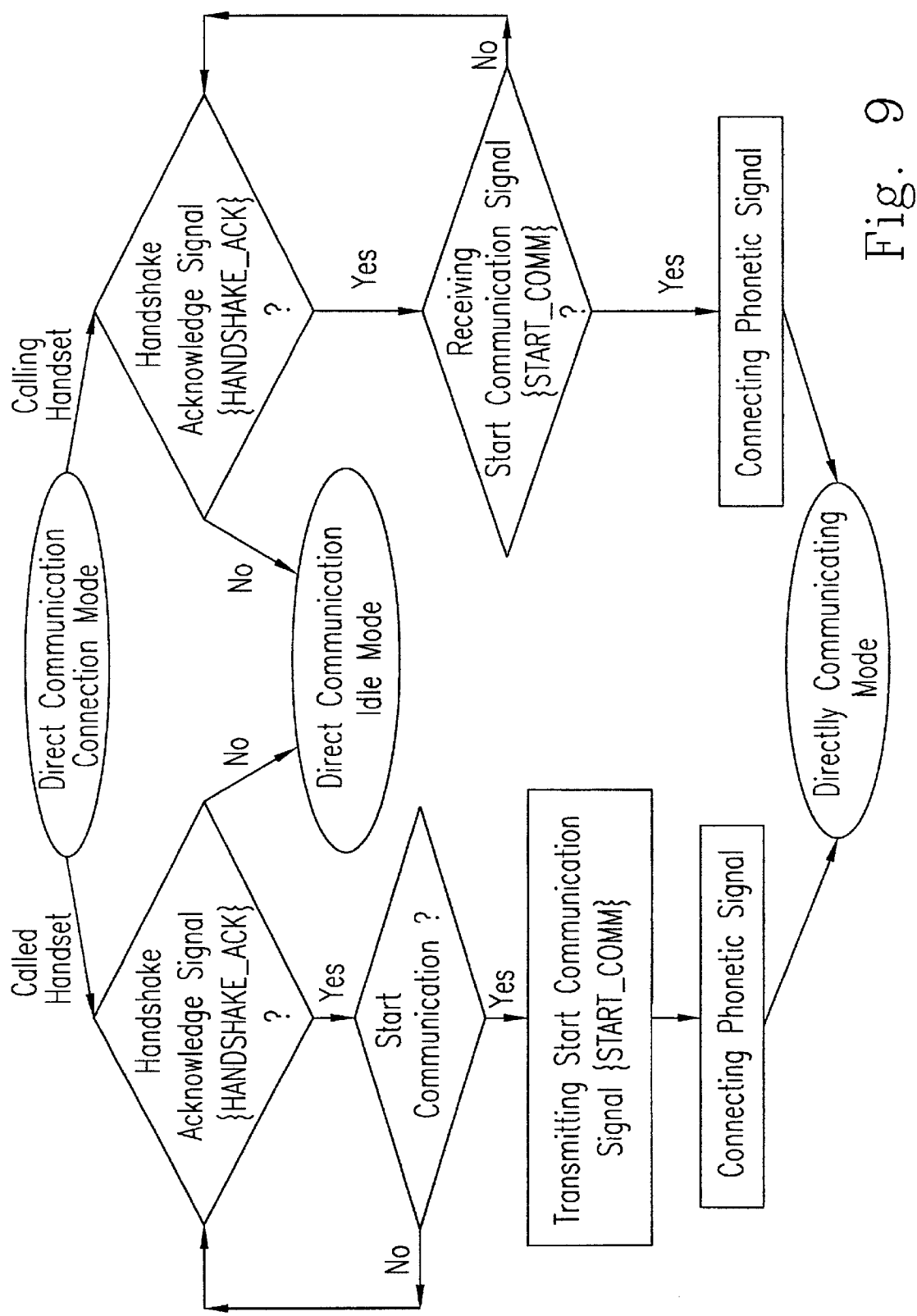
FIG. 9 is a flow chart showing what a direct communication connection mode will proceed according to the present invention.
Figure 10:
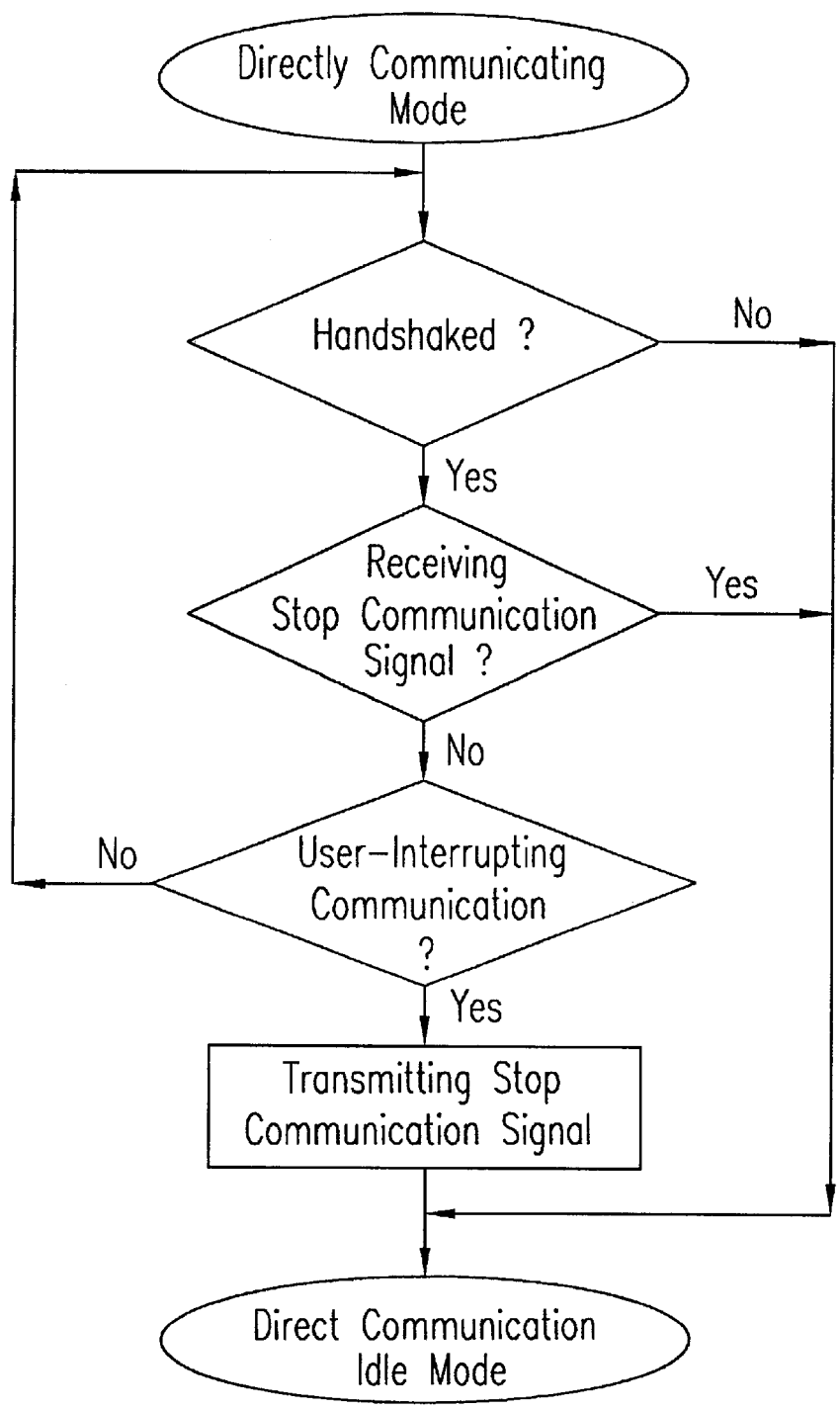
FIG. 10 is a flow chart showing what a directly communicating mode will proceed according to the present invention.

FIG. 5 shows the procedure how handsets 15 are directly communicated. After the direct communication ID code is generated, calling handset 15 will enter into a direct communication idle mode as shown in FIG. 6. When the direct communication between handsets 15 is desired, the user will switch the function key to initialize the handset 15 which will enter in turn into the direct communication calling mode as shown in FIG. 7, the direct communication connection mode as shown in FIG. 9 and the directly communicating mode as shown in FIG. 10.

Figure 8:
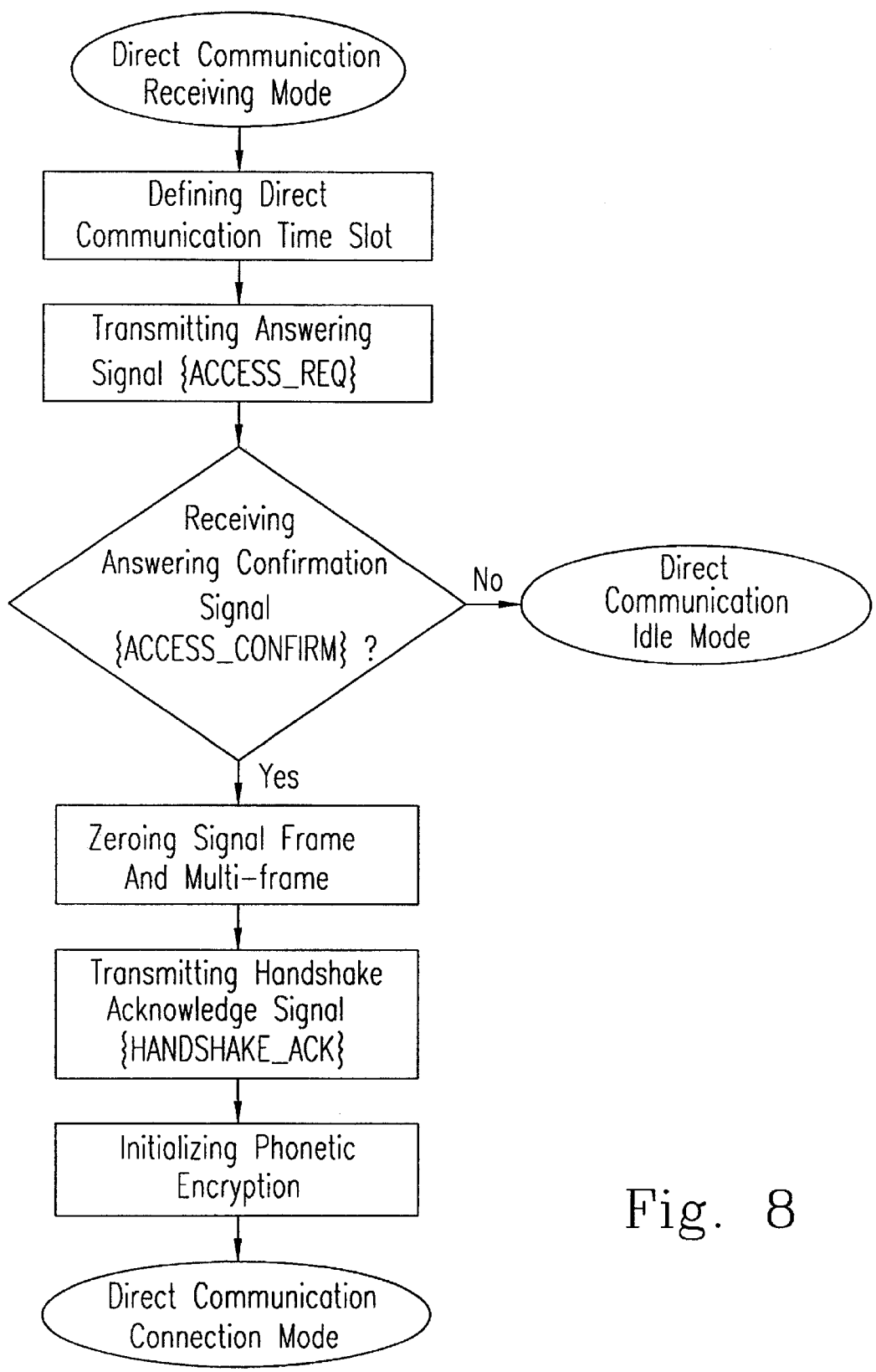
FIG. 8 is a flow chart showing what a direct communication receiving mode will proceed according to the present invention.

By the same token, after encoding, called handset 15 will enter into the direct communication idle mode also. Nevertheless, upon receiving the calling signal (CALL_REQ), called handset 15 will in turn enter into the direct communication receiving mode as shown in FIG. 8, the direct communication connection mode and the directly communicating mode for direct communication with calling handset 15. In order to save energy while communicating, the phonetic signal will be received/transmitted only when the user is talking.

As an example, we can manually input or somehow set in the DECT system to input the same number 1234 respectively into a first and a second handsets to obtain through an algorithm operation a direct communication ID 13579, a key 246801234567 for additional communication encryption and a down link channel number (3, 5) and an up link channel number (3, 17) for handset direct communication where 3 denotes the carrier number and 5 or 17 denotes the slot number. As shown in FIG. 6, after entering into the direct communication idle mode, handsets will enter into the direct communication calling mode if the direct communication has been initialized. If not, handsets will enter into an idle state for energy-saving. After a predetermined period of time has been counted up, by scanning all over 2 DECT multi-frames for finding a specific time slot in which a calling signal (CALL_REQ) from the calling handset is received, the called handset will enter into the direct communication receiving mode when the direct communication ID codes of the first and second ID codes match with each other during the specific time slot. Specifically, the handset will be periodically (e.g. every 620 ms) waked up for receiving the calling signal (CALL_REQ) from the other handset in the predetermined carrier number (e.g. 3) certain period of time (e.g 20 ms).

Figure 7:
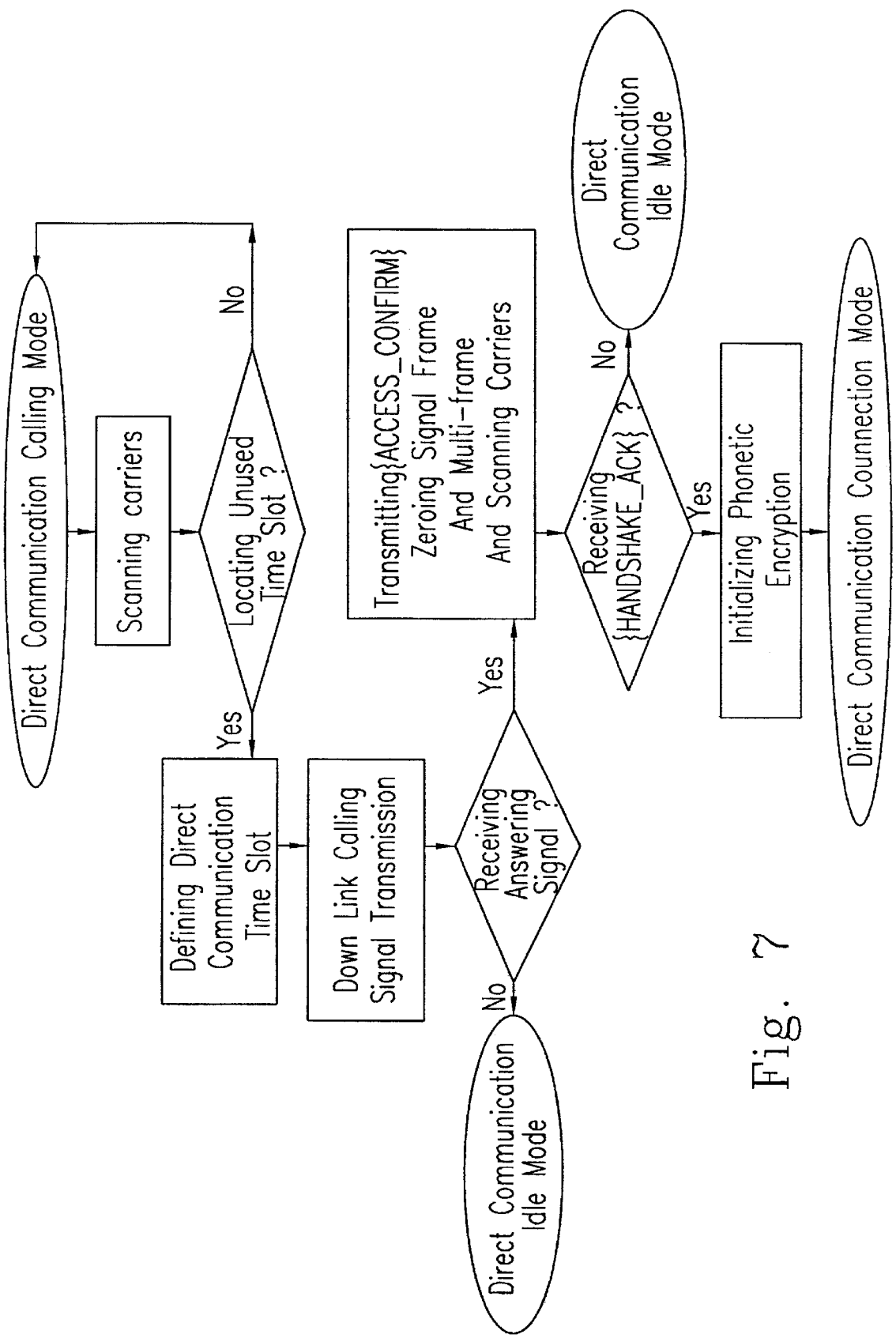
FIG. 7 is a flow chart showing what a direct communication calling mode will proceed according to the present invention.

As shown in FIG. 7, when the calling handset is to call the called handset, the calling handset is switched into the direct communication calling mode to proceed the following steps of:

scanning carriers and locating by the local slot counter an unused one, e.g. No. 13 of time slots of a respective channel, e.g. No. 3, defining the one time slot, No. 13 as a predetermined time slot or a down link channel number (3, 5), where 3 denotes the carrier number and 5 denotes the slot number, of the calling handset, and transmitting for a specific period of time, e.g. 800 ms the down link calling signal (CALL_REQ) including direct communication ID code 13579 of the calling handset to the called handset in this predetermined time slot (3, 5);

entering into the direct communication idle mode if no answering signal (ACCESS_REQ) in the corresponding up link channel number (3, 17) is received from the called handset which means that two handsets interdistance too much so as to abandon the calling procedure, while upon receiving the answering signal from the called handset, transmitting the answering confirmation signal (ACCESS_CONFIRM), zeroing the signal frame and the multi-frame and scanning carriers; and checking whether the handshake acknowledge (HANDSHAKE_ACK) signal is received? If no, entering into the direct communication idle mode and if yes, initializing the phonetic encryption and then entering into the direct communication connection mode.

As shown in FIG. 8, when the handset (e.g. the called one) in the direct communication idle mode is waked up every 620 ms to scan for 20 ms the carrier 3 for receiving the calling signal (CALL_REQ) to have compared to find the direct communication identification code 13579 contained in the calling signal is the same or matchable with that (13579) of its own in a particular channel, the handset will be switched to the direct communication receiving mode and then the relevant specific time slot is defined as a predetermined time slot or the down link channel (3, 5) of said called handset so that the bit counter and the slot counter of both handsets are synchronized. In the predetermined up link channel (3, 17), an answering signal (ACCESS_REQ) is transmitted to the calling handset. If the answering confirmation signal (ACCESS_CONFIRM) is not received in the down link channel (3, 5) of the next DECT frame, the (called) handset will enter into the direct communication idle mode. If yes, the local multiframe counter and the frame counter of the called handset are zeroed so that the multiframe counters and the frame counters of both handsets are synchronized, the handshake acknowledge signal (HANDSHAKE_ACK) is transmitted in the up link channel (3, 17) of the same DECT frame, and the encoded encryption key will initialize the phonetic encryption for the called handset so that the direct communication between handsets is established and the called handset will enter into the direct communication connection mode. Similarly, the relevant encoded encryption key will initialize the phonetic encryption for the calling handset and then the calling handset will enter into the direct communicating connection mode.

It is well-known that every channel or time slot can be represented by a specific code.

As shown in FIG. 9, in the direct communication connection mode, the calling (called) handset will proceed the following steps of: returning to the direct communication idle mode when the handshake acknowledge signal (HANDSHAKE_ACK) from the called (calling) handset fails or does not exist. If yes, the calling handset will further check whether the start communication signal is received? If no start communication signal is received, the calling handset will return to check whether the acknowledge signal (HANDSHAKE_ACK) is existent. Whereas, the called handset will further check whether the user desires to start communication. If not, the called handset will return to check whether the acknowledge signal (HANDSHAKE_ACK) is existent; and if yes, the called handset will transmit the start communication signal; and connecting a phonetic signal (U-Plane) of the calling (called) handset for proceeding a directly communicating procedure upon receiving a start communication signal from the called handset (after transmitting the start communication signal).

In this embodiment, when two handsets have been set in direct communication, the called handset will notify the user by a ringing signal upon receiving the calling signal from the calling handset. After the user presses the talking key, the called handset will connect the phonetic signal and notify the calling handset to connect the phonetic signal. In the direct communication connection mode, the calling handset will show [READY] to indicate that the called handset has been found. Upon confirming the called handset has connected the phonetic signal, the calling handset will connect the phonetic signal at the same time and show [TALKING] for the user to communicate.

Figure 11:
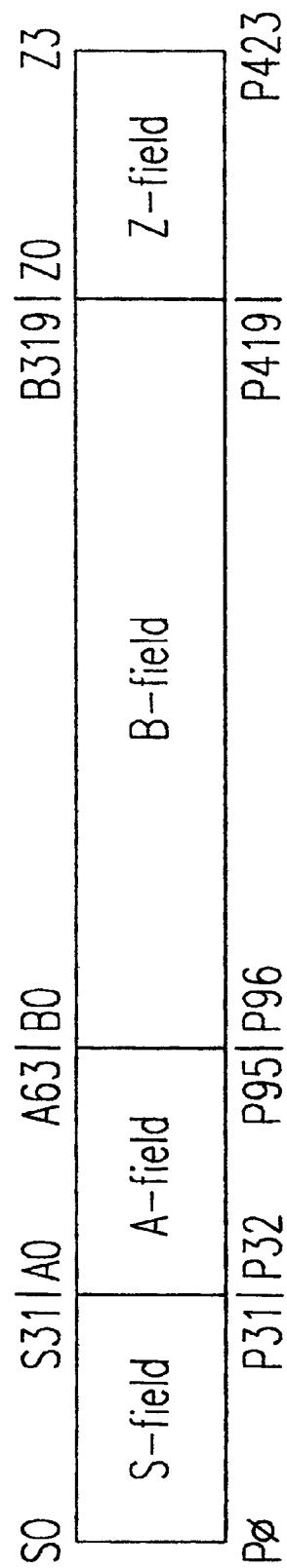
FIG. 11 is a diagram showing a format for a DECT time slot according to the present invention.

After the direct communication connection has been established between handsets, handsets will transmit/receive the handshake acknowledge signal (HANDSHAKE_ACK) for handshaking with each other until the connection therebetween is interrupted. After communicated, handsets through the provision of the voice active detector will decide whether the phonetic signal should be transmitted and will notify the handset to be communicated whether the information transmitted in this time slot contains the phonetic signal (U-plane) according to the information included in the handshake acknowledge signal (HANDSHAKE_ACK). Accordingly, the handset will transmit/receive the phonetic signal only when the user is talking. Otherwise, the handset will only transmit the handshaking signal for communicating handsets for energy-saving in transmitting/receiving the phonetic signal. Describing differently, as shown in FIG. 10, the directly communicating procedure includes the following steps of:

checking whether the handshake acknowledge signal for connecting handsets has been transmitted to the to-be-communicated handset in an A-field of the predetermined time slot. If no, the handset is caused to enter into the direct communication idle mode; and if yes, the phonetic signal will be transmitted to the called handset in a B-field of the predetermined time slot when the user of the calling handset is talking; and checking whether a stop communication signal is received? If yes, the handset will enter into the direct communication idle mode; and if not, the handset will check whether a user-interrupting communication signal is received? If not, the handset will check again whether the handshake acknowledge signal for connecting handsets has been transmitted to the to-be-communicated handset; and if yes, the handset will transmit the stop communication signal and then enter the direct communication idle mode. If the distance between handsets becomes larger and larger, handsets will not receive the correct handshake acknowledge signal (HANDSHAKE_ACK) for a period of time to finally respectively enter into the direct communication idle mode. Referring now to FIG. 11, according to the DECT slot structure, a full time slot includes an S-field for ascertaining that handsets have the synchronized time slot, an A-field for transmitting/receiving the control signal (S-plane data), e.g. the handshake acknowledge signal (HANDSHAKE_ACK) or the calling signal (CALL_REQ), a B-field for transmitting/receiving the phonetic signal or the digital data (U-plane data), and a Z-field. Since the length of A-field is far less than that of B-field, handsets maintained in connection will only consume a small amount of energy if kept positively active only when the user is talking through the provision of the voice active detector.

The present method can not only be applied to phonetical inter-communication but used for data transmission in a manner similar to the general wireless RS-232 cable for internal office wireless transmission. By adopting the DECT system, a higher transmission speed up to 1 Mbps can be obtained.

For energy-saving in the DECT system, the DECT S-plane is used for maintaining the connection and synchronization of handsets. In other words, energy consumption in transmitting and receiving will occur only in the A-field of the active full slot since through the provision of the voice active detector, energy will be consumed only when there is a phonetic signal or a data transmission to be executed in B-field of the relevant time slot. As such, handsets according to the present invention will be more energy-saving than the general wireless telecommunication speaker.

For compatible with the original DECT system, the direct communication protocol is decided according to the communication protocol of the original DECT system. Since handsets can directly communicate with each other without the involvement of the base, handsets will not interfere with the operation of the DECT system nearby. Certainly, the functions, e.g. handover and advance_connect, according to the communication protocol in the original DECT system can be applied in handsets.

Describing differently, a method for directly communicating handsets according to the present invention includes the following steps of:

providing a first handset and a second handset;

causing the first handset to enter into a direct communication idle mode;

causing the first handset to enter into a direct communication calling mode, e.g. as shown in FIG. 6, once the first handset is desired to require a direct communication;

receiving a calling signal, e.g. including an encrypted code for encrypting a data and a channel number for identifying a communication channel, from the second handset;

causing the first handset to enter into a direct communication receiving mode, e.g. as shown in FIG. 8, upon identifying the calling signal contains a partial signal, e.g. a direct communication ID code, matching with a corresponding one of the first handset for synchronizing the first and second handsets;

causing the first handset to enter into a direct communication connection mode, e.g. as shown in FIG. 9; and causing the first handset to enter into a directly communicating mode, e.g. as shown in FIG. 10, upon transmitting a data.

As stated earlier, in the method for directly communicating handsets according to the present invention, it might be preferred to include therein a step of encrypting a data before entering into the direct communication connection mode for a secret purpose. While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A method for directly communicating handsets, comprising the following steps of:
providing a calling handset and a called handset;
inputting a first number to said calling handset for obtaining a first identification (ID) code therefor;
inputting a second number to said called handset for obtaining a second ID code therefor, wherein each of said first and second ID codes comprises a direct communication ID code and a channel number;
transmitting said first ID code from said calling handset to said called handset when said calling handset is to call said called handset;
identifying whether said first ID code matches with said second ID code; and
synchronizing said two handsets for a direct communication if said first ID code matches with said second ID code,
wherein when a handshake fails between said two handsets, a starting communication signal is sent from said called handset to said calling handset and a phonetic signal of said called handset is connected.

2. A method for directly communicating handsets according to claim 1 wherein said handsets are used in a European DECT system.

3. A method for directly communicating handsets according to claim 1 wherein said first and second numbers are respectively encoded by said calling and called handsets into said first and second ID codes respectively.

4. A method for directly communicating handsets according to claim 1 wherein said identifying step is to identify whether said first and second ID codes are identical in part at least.

5. A method for directly communicating handsets according to claim 1 wherein when said calling handset calls said called handset, said calling handset enters into a direct communication idle mode in which said calling handset will proceed a direct communication calling mode for calling said called handset when a direct communication initialization of said calling handset is true.

6. A method for directly communicating handsets according to claim 5 wherein in said direct communication calling mode, there are the following steps:
locating an unused one of time slots of a respective channel, defining said one time slot as a predetermined time slot of said calling handset, and transmitting said direct communication ID code of said calling handset to said called handset in said predetermined time slot; and entering into a direct communication connection mode upon receiving an answering signal from said called handset.

7. A method for directly communicating handsets according to claim 6 wherein a code representing said predetermined time slot is generated when said first number is encoded into said first ID code in order to synchronize handsets.

8. A method for directly communicating handsets according to claim 6 wherein said direct communication connection mode includes the following steps of:
returning to said direct communication idle mode when a handshake acknowledge signal from said called handset fails; and
connecting a phonetic signal of said calling handset for proceeding a directly communicating procedure upon receiving a start communication signal from said called handset.

9. A method for directly communicating handsets according to claim 8 wherein said directly communicating procedure includes the following steps of:
transmitting a handshake acknowledge signal for connecting said handsets in an A-field of said predetermined time slot; and
transmitting said phonetic signal to said called handset in a B-field of said predetermined time slot when a user of said calling handset is talking.

10. A method for directly communicating handsets according to claim 1 wherein said direct communication receiving mode includes the following steps of:
defining said specific time slot as a predetermined time slot of said called handset;
transmitting an answering signal to said calling handset; and entering into a direct communication connection mode.

11. A method for directly communicating handsets according to claim 10 wherein a code representing said predetermined time slot is generated when said second number is encoded into said second ID code in order to synchronize said handsets.

12. A method for directly communicating handsets according to claim 10 wherein said direct communication connection mode includes the following steps of:
returning to said direct communication idle mode when said handshake between said two handsets fails;
transmitting said starting communication signal from said called handset to said calling handset once a user of said called handset decides to connect; and
connecting said phonetic signal of said called handset for entering into a direct communicating mode.

13. A method for directly communicating handsets according to claim 12 wherein said directly communicating mode includes the following steps of:
transmitting a handshake signal for maintaining a connection between said handsets in an A-field of said predetermined time slot; and
transmitting said phonetic signal to said calling handset in a B-field of said predetermined time slot when said user is talking.

14. A method for directly communicating handsets according to claim 1 wherein each of said first and second ID numbers includes an additional encryption code.

15. A method for directly communicating handsets according to claim 1, wherein when said called handset receives said first ID code, said called handset enters into a direct communication idle mode which includes the following steps of:
entering into an idle state;
scanning time slots of a channel corresponding said channel number;
finding a specific time slot in which a calling signal from said calling handset is received; and
entering into a direct communication receiving mode when said direct communication ID codes of said first and said second ID codes match with each other during said specific time slot.

16. A method for directly communicating handsets comprising the steps of:
providing a first handset and a second handset;

causing said first handset to enter into a direct communication idle mode;

causing said first handset to enter into a direct communication calling mode once said first handset is desired to require a direct communication;

receiving a calling signal from said second handset;

causing said first handset to enter into a direct communication receiving mode upon identifying said calling signal contains a partial signal matching with a corresponding one of said first handset for synchronizing said first and second handsets;

causing said first handset to enter into a direct communication connection mode; and causing said first handset to enter into a directly communicating mode upon transmitting a data, wherein said directly communicating mode proceeds the step of returning to said direct communication idle mode upon receiving a stop communication signal from said second handset;

returning to said direct communication idle mode if a handshake between said handsets fails; and transmitting a stop communication signal to enter into said direct communication mode when said first handset has an interrupted communication.

17. A method for directly communicating handsets according to claim 16 wherein said partial signal is a direct communication ID code.

18. A method for directly communicating handsets according to claim 17 wherein in said calling mode, the following steps are proceeded:

locating an unused time slot;

setting said unused time slot as a direct communication time slot;

transmitting a calling signal in said direct communication time slot; and transmitting a confirming signal upon receiving an answering signal from said second handset.

19. A method for directly communicating handsets according to claim 18, further comprising a step of encrypting a data before said first handset having received a handshake acknowledge signal enters into said direct communication connection mode.

20. A method for directly communicating handsets according to claim 18 wherein said direct communication connection mode proceeds the following steps of:

transmitting a start communication signal upon generating said data and confirming an existence of a handshake acknowledge signal; and entering into said directly communicating mode upon receiving a start communication signal from said second handset.

21. A method for directly communicating handsets according to claim 18 wherein said calling signal includes:

an encrypted code for encrypting a data; and a channel number for identifying a communication channel.

22. A method for directly communicating handsets according to claim 16 wherein said direct communication receiving mode proceeds the following steps of:

identifying a communication time slot in which said calling signal is identified to contain said partial signal matching with said corresponding one of said first handset;

transmitting an answering signal; and transmitting a handshake acknowledge signal upon receiving an answering confirmation signal from said second handset.

23. A method for directly communicating handsets according to claim 22 further comprising a step of encrypting a data before entering into said direct communication connection mode.

24. A method for directly communicating handsets according to claim 16 wherein said handsets are European digital wireless DECT (Digital Enhanced Cordless Telecommunications) telephones.

* * * * *